United States Patent
Bains

(10) Patent No.: US 7,627,804 B2
(45) Date of Patent: Dec. 1, 2009

(54) MEMORY DEVICE WITH SPECULATIVE COMMANDS TO MEMORY CORE

(75) Inventor: Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 11/479,102

(22) Filed: Jun. 30, 2006

(65) Prior Publication Data

US 2008/0005647 A1    Jan. 3, 2008

(51) Int. Cl.
*H03M 13/00* (2006.01)

(52) U.S. Cl. ............... 714/781; 714/758; 712/218

(58) Field of Classification Search ........... 714/781, 714/6, 718, 763, 805; 712/218
See application file for complete search history.

(56) References Cited

U.S. PATENT DOCUMENTS

| | | | |
|---|---|---|---|
| 5,603,010 A | 2/1997 | Dodd et al. | |
| 5,826,053 A * | 10/1998 | Witt | 712/210 |
| 5,956,753 A | 9/1999 | Glew et al. | |
| 6,463,522 B1 * | 10/2002 | Akkary | 712/216 |
| 6,519,735 B1 * | 2/2003 | Holman et al. | 714/763 |
| 6,591,393 B1 | 7/2003 | Walker et al. | |
| 6,625,707 B2 | 9/2003 | Bormann | |
| 6,895,527 B1 | 5/2005 | Quach et al. | |
| 6,941,493 B2 | 9/2005 | Phelps | |
| 6,993,633 B1 | 1/2006 | Sakakibara et al. | |
| 2003/0188219 A1 * | 10/2003 | DeRuiter et al. | 714/6 |
| 2005/0108465 A1 | 5/2005 | Vogt | |
| 2005/0108490 A1 | 5/2005 | Vogt | |
| 2005/0108611 A1 | 5/2005 | Vogt | |
| 2006/0069948 A1 | 3/2006 | Seo et al. | |

FOREIGN PATENT DOCUMENTS

| | | |
|---|---|---|
| JP | 63020641 | 1/1988 |
| JP | 02143991 | 6/1990 |
| JP | 04003237 | 1/1992 |

OTHER PUBLICATIONS

International Search Report for Corresponding matter P24358PCT, dated Dec. 7, 2007.

* cited by examiner

*Primary Examiner*—Guy J Lamarre
(74) *Attorney, Agent, or Firm*—Alan K. Aldous

(57) ABSTRACT

In some embodiments, a chip includes a memory core, error detection circuitry, and a control unit. The error detection circuitry determines the validity of error detection signals associated with speculative and non-speculative commands received by the chip and to provide validity signals indicative of the determined validity. The control unit provides the speculative commands to the memory core to be acted on before the control unit receives the associated validity signals and to provide the non-speculative commands to the memory core to be acted on only after receiving associated validity signals that indicate the associated error detection signals are valid. Other embodiments are described and claimed.

23 Claims, 6 Drawing Sheets

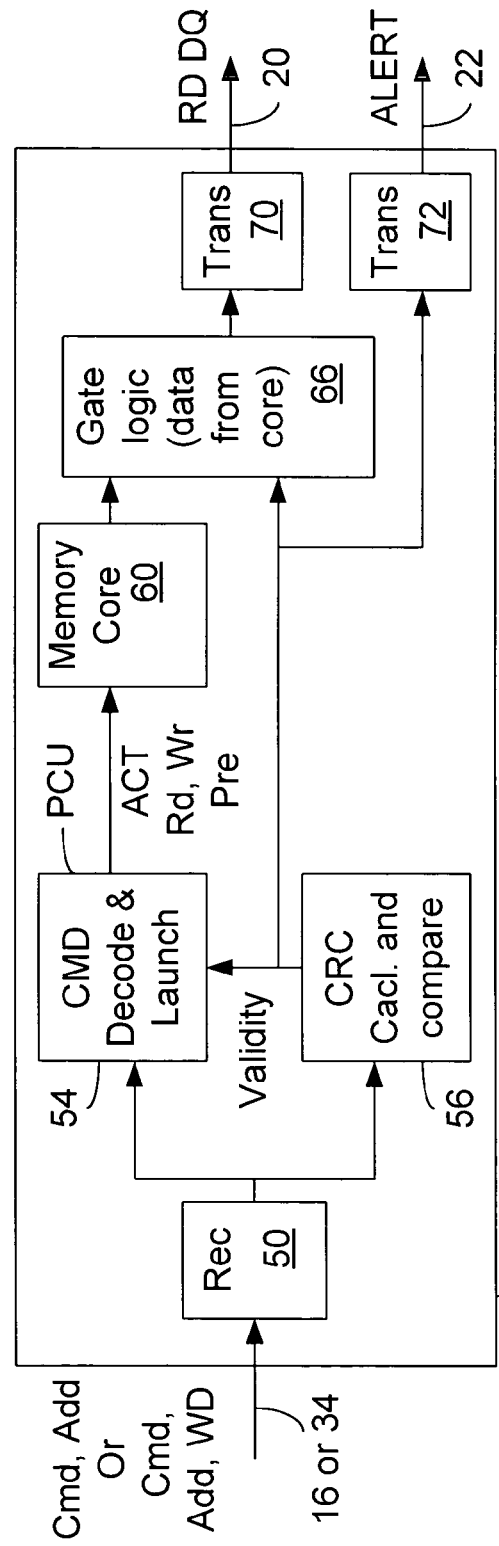

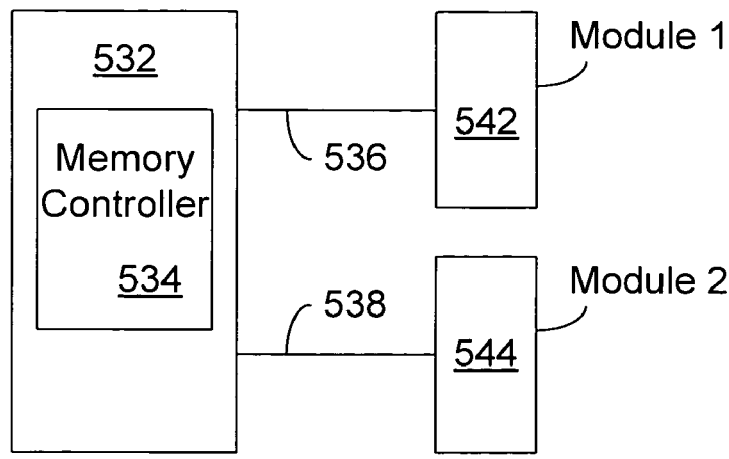
FIG. 13
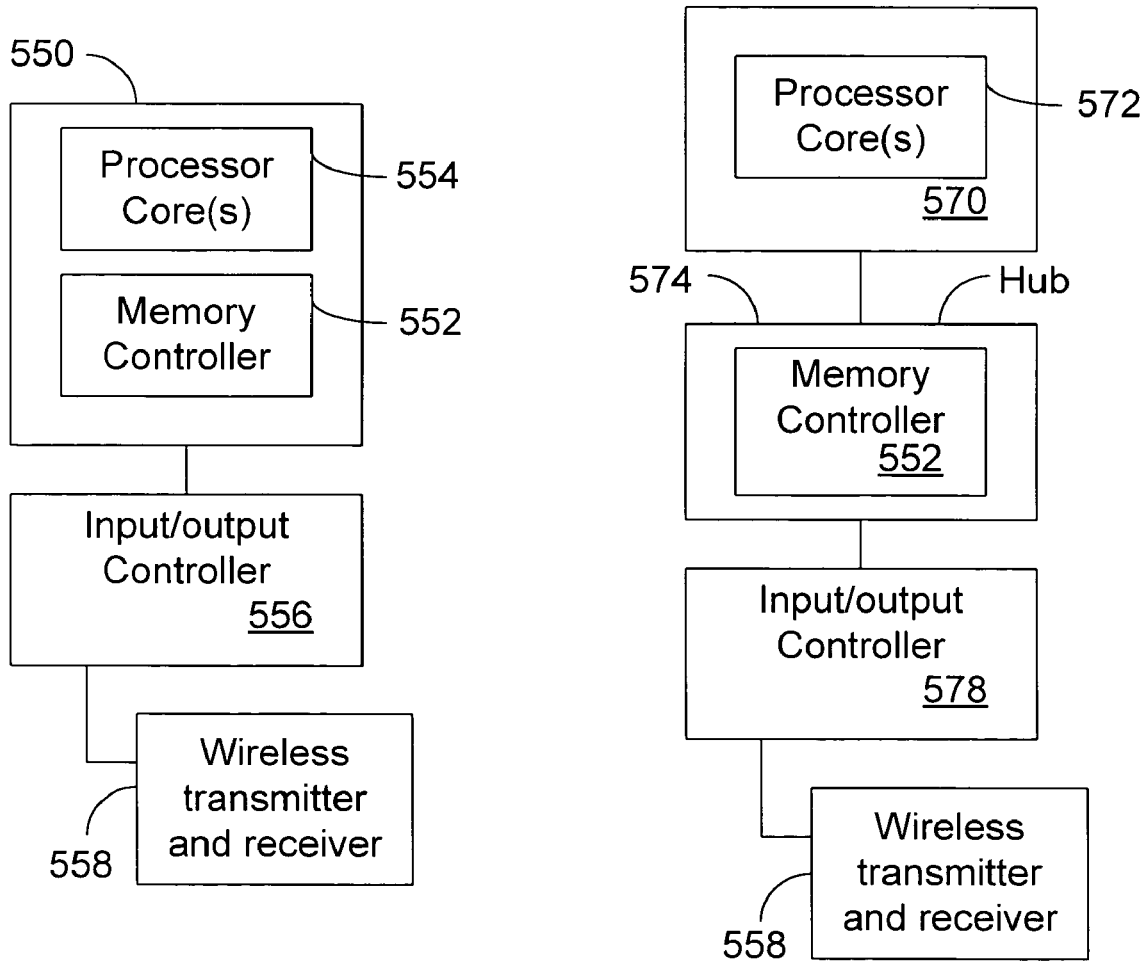
FIG. 14
FIG. 15

MEMORY DEVICE WITH SPECULATIVE COMMANDS TO MEMORY CORE

BACKGROUND

1. Technical Field

The inventions relate to chips with memory cores and to systems including the chips. In some embodiments, a memory core begins acting on the certain commands before the validity of associated CRC checksums is determined.

2. Background Art

Various arrangements for memory devices in a memory system have been proposed. For example, in a traditional synchronous dynamic random access memory (DRAM) system, memory devices communicate data through bidirectional data buses and receive commands and addresses through command and addresses buses. In some implementations, the memory devices have stubs that connect to the buses in a multi-drop configuration. Other designs include point-to-point signaling. Bidirectional signaling may be sequential or simultaneous.

Various error detection techniques have been used. Cyclic redundancy check (CRC) is a well know procedure wherein a checksum is produced from a large number of bits. The checksum is used to detect errors after transmission or storage. The checksum is calculated and appended to data before transmission or storage. The checksum of the data is recalculated later and compared with the appended checksum. If the original and later calculated checksums do not match, there is reason to doubt the accuracy of the data or a command contained in the data. Various responses can be made such as resending the data. There are a variety of types of CRC procedures and recovery methods. Some of the error detection techniques, such as error correcting code (ECC), involve error correction techniques.

As speeds of interconnect signaling increase, the bit error rate (BER) may also increase. CRC procedures have been proposed for use in memory systems including DRAM memory systems. The checksums can be recalculated in the DRAM and compared with the received checksum. Write data can stay in a posted write buffer until a match is determined. The system can respond in various ways if there is not a match including ignoring certain data, resending certain data, including chains of commands, perform ECC, reinitializing a link, and/or reinitializing a portion of a memory core. The amount of time taken to compute a CRC checksum may be relatively large in comparison to the time taken to perform certain operations in a DRAM memory such as a read operation. Calculation of the CRC checksum may be the longest timing path that gates the issuing of commands to a DRAM core.

Memory controllers provide various commands to memory devices. These commands include a precharge command (PRE), an activate command (ACT), a read command (RD), and a write command (WR). Some commands come in chains over time in which some commands follow other commands in a progression (for example, PRE, ACT, CAS). Read and write commands are sometimes called CAS commands. There are many variations on these commands. Some compound commands from memory controllers are divided into subcommands by the memory device. For example, a combined ACT/RD command, is divided into an ACT command and a RD command by the memory device.

Commands, addresses, write data, and read data have been transmitted in a variety of forms including packets and frames. Frames are a type of packet in which signals on parallel lanes are provided in a particular number of unit intervals (UI).

Memory modules include a substrate on which a number of memory devices are placed. A dual in-line memory module (DIMM) is an example. In some systems, a buffer is also placed on the substrate. For at least some signals, the buffer interfaces between the memory controller (or another buffer) and the memory devices on the module. In such a buffered system, the memory controller can use different signaling with the buffer than the buffer uses with the memory devices. Multiple modules may be in series and/or parallel. There may be one memory device in a chip or more than one memory device in a chip. Chips may be in stacks.

Some computer systems having included some memory devices on a motherboard and other memory devices on a memory module or other card in a connector on the motherboard.

In some memory systems, the memory devices receive signals and repeat them to other memory devices as well as provide requested data signals to next memory devices. Read data signals can be provided to the memory controller through a point-to-point unidirectional return link from the last memory device in a series of memory devices in a looped fashion or from a memory device that is not the last memory device in the series.

Memory controllers have been used in chipset hubs and in a chip that includes a processor core. Some computer systems include wireless transmitter and receiver circuits.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

FIG. 5 is a graphical representation of a activate frame including CRC checksum bits according to some embodiments.

FIGS. 6-8 are each a block diagram representation of some details of the memory devices of one or more of FIGS. 1-4 accordingly to some embodiments.

FIGS. 11-15 are each a block diagram representation of a system including a memory controller according to some embodiments.

DETAILED DESCRIPTION

In some embodiments, a memory device includes a memory core that begins acting on certain speculative commands before the validity of associated error detection signals (such as CRC checksums) is determined. Since the speculative commands are issued before checking the CRC errors, some embodiments include mechanisms to ensure no data corruption or timing violation has occurred as a result of the speculative commands.

Figure 1:
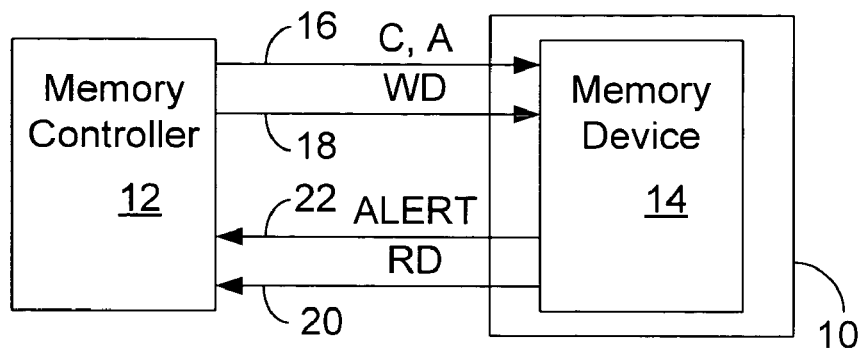
FIGS. 1-4 are each a block diagram representation of a memory system including a memory controller and memory device accordingly to some embodiments.

Referring to FIG. 1, a system includes a memory controller 12 that interfaces with a memory device 14 through a link 16, a link 18, a link 20, and a link 22. Memory device 14 is part of a chip 10, which may be essentially only a memory chip or which may perform other significant functions such as processing, moving signals between other chips, and communication functions.

Link 16 carries command and address signals from memory controller 12 to memory device 14. Link 18 carries write data signals from memory controller 12 to memory device 14. Link 20 carries read data signals from memory device 14 to memory controller 12. In the example of FIG. 1, links 16, 18, and 20 are used unidirectionally, but in other embodiments, one or more of the links could be bi-directional. Links 16, 18, and 20 may each include multiple lanes. At least some of the command and address signals provided by memory controller 12 on link 16 have associated CRC checksums. Memory device 14 determines the validity of these checksums and if the checksums are invalid, memory device 14 sends an alert signal on link 22 alerting memory controller 12 that the checksums of the corresponding signals were invalid.

The command and address signals may be provided in groups of signals. Examples of the groups include frames and packets. CRC checksums may be part of the groups of signals or provided elsewhere. FIG. 5 illustrates an example frame in which signals are carried on six lanes (0, 1, 2, 3, 4, 5, and 6) and the frame lasts nine unit interval (UI) transfers (0, 1, ... 8), although the frame could involve more or less than six lanes and more or less nine UI transfers. In this example, checksum bits are include in lanes 0 and 3 in UI 7 and in lanes 0-5 of UI 8, but the bits could be in other positions in the frame. As an example, the frame of FIG. 5 may be an "Activate" command used to open a row of memory. Other bits in the frame may specify a group of banks, a bank, a row address, and whether the frame carries a command, or read or write data, or both, and other features such as link power down features. Of course, the inventions are not limit to use of frames with these details, or frames at all. Certain items such as read or write data may take multiple frames such as a header frame and two data frames.

Mere as an example, and not a requirement, 1 frame may have a duration of 2.5 nanoseconds (ns) at 3.6 giga transfers (GT)/sec. The time taken to calculate a CRC checksum may be on the order of a frame or greater. As the interconnect frequency increases, the time taken to calculate a CRC checksum may increase relative to the time of a frame. If the checksum needs to be calculated before the core begins performing a read command, this will add delay to receiving the read data.

Figure 2:
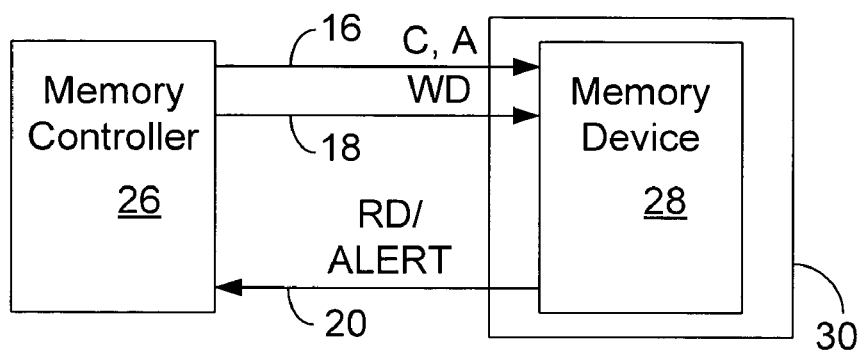

In FIG. 2, memory controller 26 and memory device 28 are like memory controller 12 and memory device 14 of FIG. 1 except that the alert signal is communicated through link 20 rather than through link 22. There are various ways in which the alert signal can be communicated. For example, the alert signal can be a bit or bits in a read frame, or signals on some, but not all, of the lanes link 20, or a corruption of a read data frame.

Figure 3:
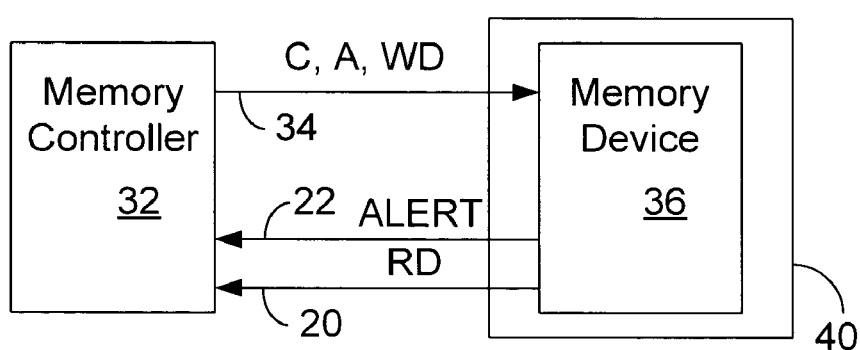

In FIG. 3, memory controller 32 and memory device 36 are like memory controller 12 and memory device 14 of FIG. 1 except that command, address, and write data are communicated through link 34.

Figure 4:
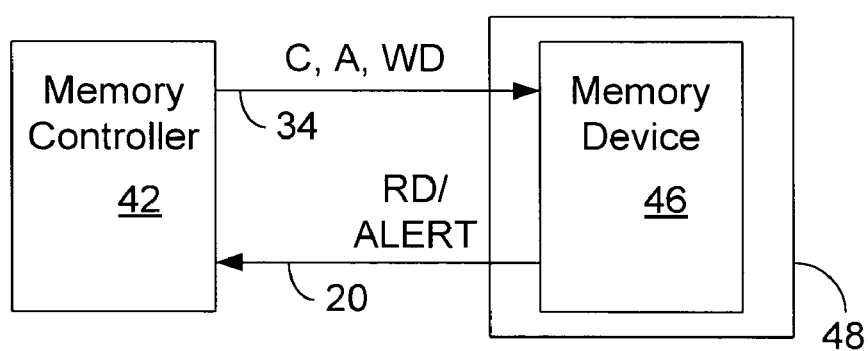

In FIG. 4, memory controller 42 and memory device 46 are like memory controller 12 and memory device 14 of FIG. 1 except that command, address, and write data are communicated through link 34, and the alert signal and read data signals are communicated through link 20 (as in FIG. 2).

Memory devices 28, 36, and 46 are part of chips 30, 40, and 48, respectively, which each may be essentially only a memory chip or may perform other significant functions. In some embodiments, the chips include only one memory device. In other embodiments, the chips include more than one memory device.

FIG. 6 shows an example of chip 10 or chip 40. FIG. 6 is an example of chip 10 if receivers 50 receive command and address signals from link 16, and it is an example of chip 40 if receivers 50 receive command, address, and write data signals from link 34. Port control unit (PCU) 54 receives signals from receivers 50 and decodes commands there from. In the case of certain commands (called herein speculative commands), PCU 54 launches (provides) the commands to memory core 60 before CRC circuitry 56 determines the validity of the associated checksums. Core 60 speculatively acts on the speculative commands because there is a possibility that the results of the command will be ignored or not used. In the case of other commands (called herein non-speculative commands), PCU 54 does not launch the command until CRC circuitry 56 determine that the CRC checksum associated with the command is valid. Frames of write data may also treated as being non-speculative. CRC circuitry 56 calculates a checksum for the data in the received frame and compares it to the checksum carried by the frame. If the checksums match, a validity signal indicates the checksum is valid, and if the checksums do not match, the validity signal indicates the checksum is invalid.

In some embodiments, examples of speculative commands include precharge (PRE), activate (ACT), and read (RD). In other embodiments, one or more of these might not be speculative commands and there may be additional speculative commands. A write (WR) command is an example of a non-speculative command. There may be various multi-function commands (for example, a combined PRE/ACT/RD command) that are also speculative commands; and multi-function commands (for example, a combined PRE/ACT/WR combined) that are also non-speculative commands. The system may use many other non-compound and compound commands that are variations of PRE, ACT, RD, and WR (for example, auto-precharge). In some embodiments, depending on the circumstances, a particular command could change between being speculative to non-speculative.

After CRC circuitry 56 determines the validity of a checksum, circuitry 56 provides a validity signal indicative of the determined validity to PCU 54, gate logic 66, and transmitters 72. In some embodiments, circuitry 56 provides the validity signals separately to PCU 54 or gate logic 66 depending on the signal type involved.

Transmitters 72 provide the validity signals to link 22. In some embodiments, the validity signals are always transmitted by transmitters 72 to link 22 when they are received (whether they indicate a valid or invalid checksum). In other embodiments, logic (not shown) allows the validity signal to be provided to link 22 only when they indicate a checksum is invalid. When the checksum is invalid, the validity signal on link 22 is referred to as an alert signal because it alerts the memory controller of an invalid checksum. In some embodiments, the validity signal is modified prior to being transmitted. In some embodiments, the validity signal indicates merely that an invalid checksum has been detected. In other embodiments, the validity system provides additional information such as which group of signals (for example, which frame) included the invalid checksum and/or what type of command it was.

Gate logic 66 holds read data signals from memory core 60. When a validity signal is received indicating a valid checksum, gate logic 66 provides the read data to transmitters 70 for transmitting over link 20. As mentioned, in some embodiments, the validity signal indicates merely whether the checksums are valid or invalid. In that case, there is some mechanism for gate logic 66 to know whether the validity signal applies to the read data it is holding. For example, in some embodiments, there is a separate conductor(s) from circuitry 56 to gate logic 66 that only provides validity signals in response to read commands (and in some embodiments earlier commands in a chain of commands, discussed below). In such embodiments, circuitry 56, PCU 54, memory core 60, and gate logic 66 may consider read data on a first in, first out basis. In other embodiments, the validity signal includes information regarding which command is having its checksum evaluated or at least the type of command so gate logic 66 can know whether the signals applies to it.

Some commands come in a chain. For example, a chain may include a precharge command, followed by an activate command, followed by a CAS (read or write command). In some embodiments, gate logic 66 only responds to a validity signal for the checksum in a read command that resulted in read data currently being held in gate logic 66. In other embodiments, gate logic 66 also responds to a validity signal for any command in the chain.

In some embodiments, if the validity signal indicates an invalid checksum, then the gate logic does not send the read data to the memory controller through link 20. In other embodiments, gate logic 66 provides the read data to transmitters 70 to be transmitted to link 20 even if the validity signal indicates an invalid checksum, but the memory controller knows to ignore the read data if a corresponding alert signal is received on link 22. In some embodiments, there may be delay circuitry (not shown) before transmitters 72 to better align the alert signal and read data on links 70 and 72, but this is not required in all embodiments.

Figure 7:
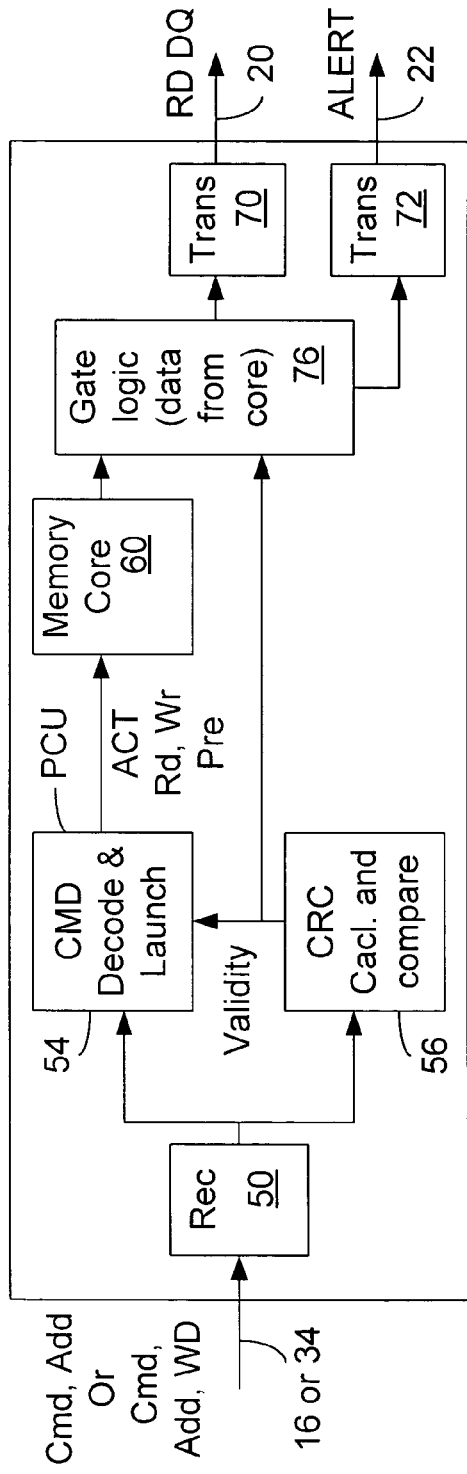

FIG. 7 is similar to FIG. 6 except that the signals to transmitters 72 receive the alert signal through gate logic 66. This allows greater coordination with signals that may be provided on link 20. Also, gate logic 76 may provide an alert signal that is somewhat different than the validity signal. For example, the signal on link 22 may be a serial signal and the validity signal is a parallel signal, but that is not required.

Figure 8:
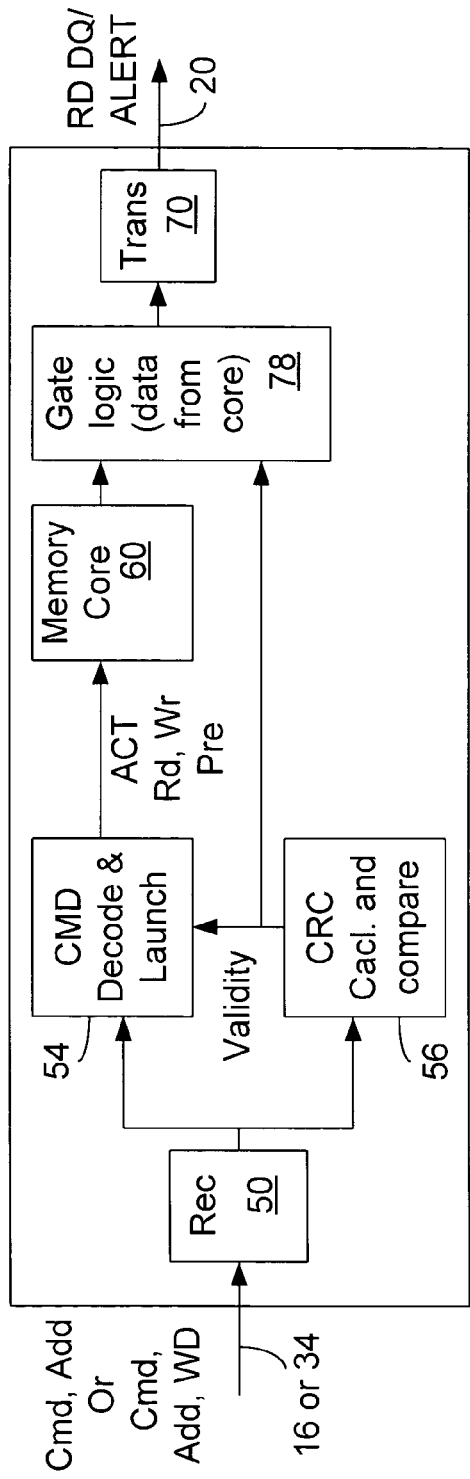

FIG. 8 shows examples of chips 30 and 48, and is similar to FIG. 6 except that both the read data and the alert signal are transmitted through link 20 from gate logic 78. In different embodiments, the alert signal is provided differently. In some embodiments, the alert signal is very different than a read data frame. In other embodiments, the alert signal is like a read data frame, but has one or more bits set differently. The alert signal may indicate the particular command and/or type of command or write data that is associated with the invalid checksum.

The memory devices may include storage such as a posted write buffer to hold write data until it is know whether the write data is associated with a valid or invalid checksum.

Figure 9:
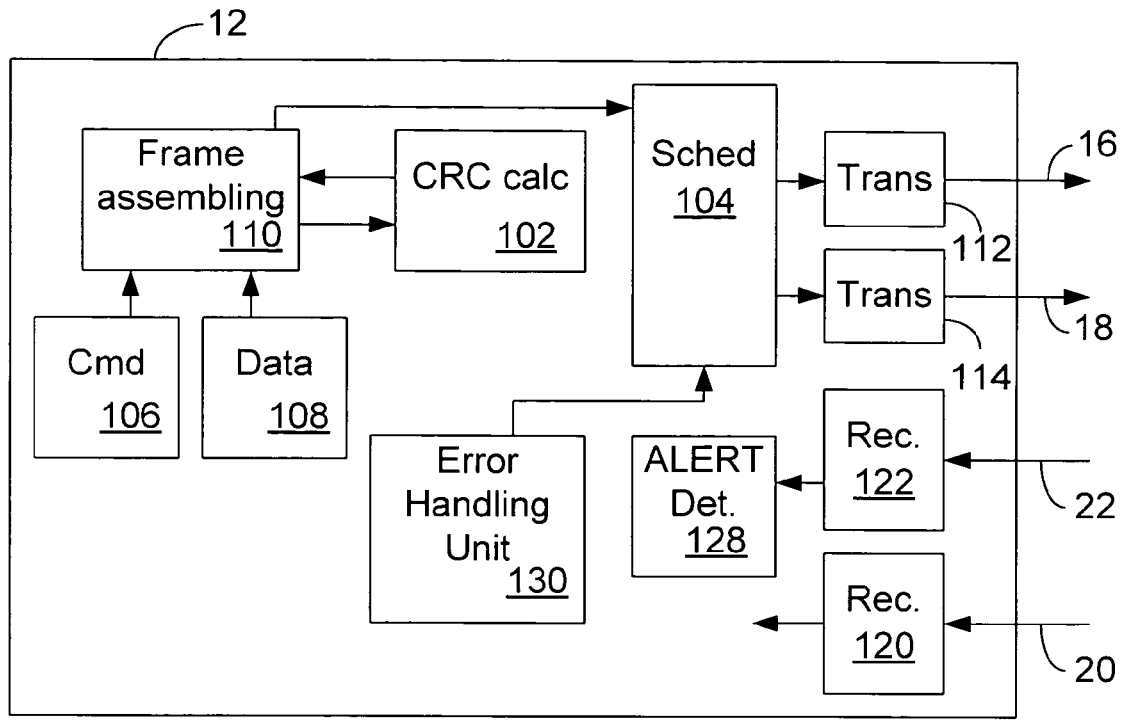
FIGS. 9-10 are block diagram representations of some details of the memory controller of FIGS. 1 and 4, respectively, accordingly to some embodiments.

FIG. 9 shows an example of memory controller 12, but the inventions are not limited to these details. Scheduling circuitry 104 receives data from a data buffer 106 and commands from a command queue 108 through frame assembling circuitry 110 and provides command and address signals to transmitters 112 and write data signals to transmitters 114. CRC calculation circuitry 102 calculates checksums based on at least some bits in the frame and provides the checksums to circuitry 110. Transmitters 112 and 114 provide signals to links 16 and 18, respectively. Read signals from link 20 are received by receivers 120 and alert signals (and in some embodiments other validity signals) are received by receivers 122 from link 22. Alert detection circuitry 128 detects an alert signal and notifies error handling unit 130. In different embodiments, there are a variety of ways in which error handling unit 130 responds to alert signals. Examples include one or more of the following: ignore associated read data, resend a single command, resend a chain of commands, and perform ECC, reinitialize a link, and/or reinitialize a portion of a memory core.

Figure 10:
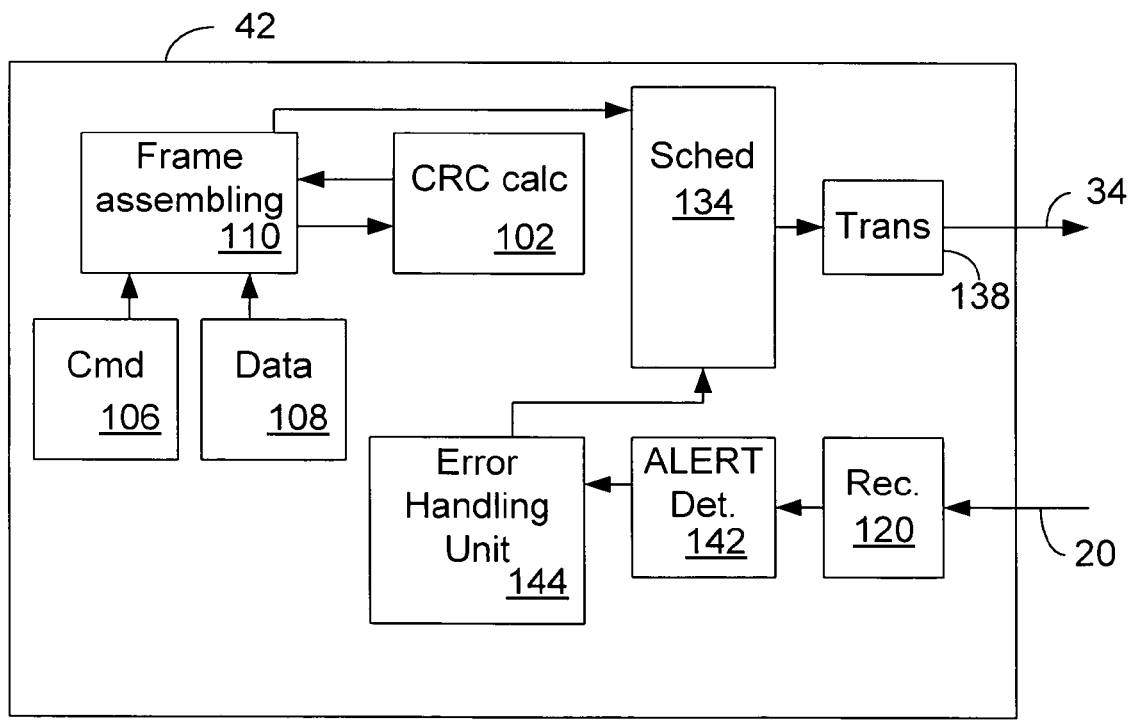

FIG. 10 shows an example of memory controller 42, but the inventions are not limited to these details. Scheduling circuitry 134 receives data from a data buffer 106 and commands from a command queue 108 and provides command, address, and write data signals to transmitters 138, which transmits to link 34. Receivers 120 receive read data and alert signals from link 20. Alert detection circuitry 142 detects an alert signal and notifies error handling unit 144. In different embodiments, there are a variety of ways in which error handling unit 144 responds to alert signals, such as those described above.

DETAILS FOR SOME EMBODIMENTS

The following are details that apply to some embodiments, but not to other embodiments. Indeed, the inventions are not limited to these details.

A. Speculate activate (ACT). To ensure no data corruption:

1. PCU 54 tracks all banks in memory core 60. All pages are marked closed at reset.

2. Speculative ACT commands issued to closed pages only. Speculative ACT command may use the bypass path and are not posted in the command queues in PCU 54 for later execution.

3. ACT command issued to core 60 marks a page open. Precharge command issued to the same bank marks the page closed after a delay of tRP. No speculative commands (ACT or RD) are allowed in the tRP window.

4. ACT is non-destructive to data. If there is a CRC checksum error then the controller may need to precharge that specific page or do a PREcharge-ALL (precharge all rows) as part of error handling mechanism.

B. Timing parameters to consider before issuing ACT: tRRD, tFAW, tRP_g, tRP_a, tRFC_g and tRFC_a.

1. tRRD: Spec for back to back ACT commands to different banks. PCU 54 checks for tRRD violation. Any ACT command issued to the DRAM core will result in blocking speculative ACT commands for a period of tRRD. (The blocked ACT command may also likely result in a CRC error as the controller would not have scheduled another ACT within tRRD window.)

Options to handle ACT violation:
  a) Issue speculative ACT and tRRD violated (risk data corruption which is not there is non-speculative mode).
  b) post the command in command queue and wait for CRC check (controller/DRAM will get out of synch in speculative mode).
  c) Delay the command by tRRD and CRC check before issuing to core 60 (controller/DRAM will again get out of synch in speculative mode).
  d) Flag an error if tRRD violated and do not issue ACT to core (recommended).

2. tFAW: four activate window. Recommend not to track this in PCU 54. There may be no checking in non-speculative mode of operation. If 5th ACT is issued in the tFAW window then it may be that either the controller intended to do so or there may be a CRC error.

3. tRP_g: row precharge—group. All speculative ACT are blocked to the DRAM array (same or different bank group) for a period of tRP_g and pages to given bank group are marked closed after a delay of tRP_g. Bank groups are groups of banks in memory core 60.

4. tRP_a: row precharge—all. All speculative ACT are blocked to the DRAM array for a period of tRP_a and all pages are marked closed after a delay of tRP_a. (Pg and Pa are non-overlapping so a single counter can be used.) Pg is precharge rows in a group of banks and Pa is precharge rows in all groups of banks.

5. tRFC_g: refresh cycle—group. All speculative ACT are blocked to the DRAM array (same or different bank group) for a period of tRFC_g and pages to given bank group are marked closed after a delay of tRP_g.

6. tRFC_a: refresh cycle—all. All speculative ACT are blocked to the DRAM array (same or different bank group) for a period of tRFC_g and pages to given bank group are marked closed after a delay of tRP_a.

Pg, Pa, Fg and Fa are non-overlapping so a single counter can be used. Fg and Fa are refresh group and refresh all commands.

The memory controller is not allowed to issue an ACT in the tRP_g, tRP_a, tRFC_g and tRFC_a window, so it is recommended to flag an error and not wait for CRC check. (Even if the CRC passes there is risk of data corruption). In non-speculative mode, the ACT may be likely to result in checksum error and if there is no checksum error then ACT may be issued immediately to the core resulting in data corruption or lock-up.

C. Speculative read case: A read is broken into two parts. One is issuing of read commands and second one covers handling read data return.

1. Issuing of read commands:
   a. Speculative RD commands issued to open pages only.
   b. Additive latency and posting case: Do not speculate as will have additional frame to check CRC. If CRC check is delayed by more than one frame (1F) then one can add deterministic speculation of read commands.
   c. Timing parameters to consider for issuing READ: tRCD, tWTR, tCCD_L tCCD_S.
   d. tRCD: After an ACT is issued to a given bank, start counting tRCD and change the status of a bank from 'open' to 'open with speculative reads allowed.'
   e. tCCD_L and tWTR (write to read latency): These timings track each other within a bank group. Need tracking per bank group as same values for bank and intra bank group. If RD or a WR issued to a bank group then block speculative read commands for tCCD_L.
   f. tCCD_S: Read commands out of PCU need tracking such that two reads are spread apart by two frames (2F) or tCCD_S. (Writes do not need to be tracked as WR to RD to different bank group constraint is 1F and simultaneous launching of WR and RD not allowed currently in PCU 54).
   g. If there is a RD that violates these timings then report an error and do not issue the RD to core 60.

2. Read Return
   a. Upon detecting CRC error for a speculative read, block the data to the controller. CRC error signal sent by yanking on ALERT.
   b. ALERT signal may need to be faster than the read latency seen by the controller.
   c. Another option is to poison the data/CRC but this has issues:
      i) If a RD got converted to some other encoding then the controller may assume that the data on the bus is valid after a fixed latency so ALERT has to be fast enough to catch this. In this case, we may not have the poisoning option (unless we poison on all CRC errors).
      ii) If some other encoding got converted to RD, then the controller may not be expecting data so poisoning CRC does not help.
      iii) Poisoning may work well if there was an error on say address bits on a RD frame.
   d. Poisoning has definite loopholes so need to get ALERT timings fast enough. (This issue is there even without speculation proposal).

A register bit in the DRAM may be defined to enable/disable speculation of command.

Conditions around speculating other commands to core 60 such as precharge can be easily developed using the same concept as for reads and activates. Advantages may include this reduces DRAM latency for all transactions, page hits, misses and empties.

Sample Systems

Figure 11:
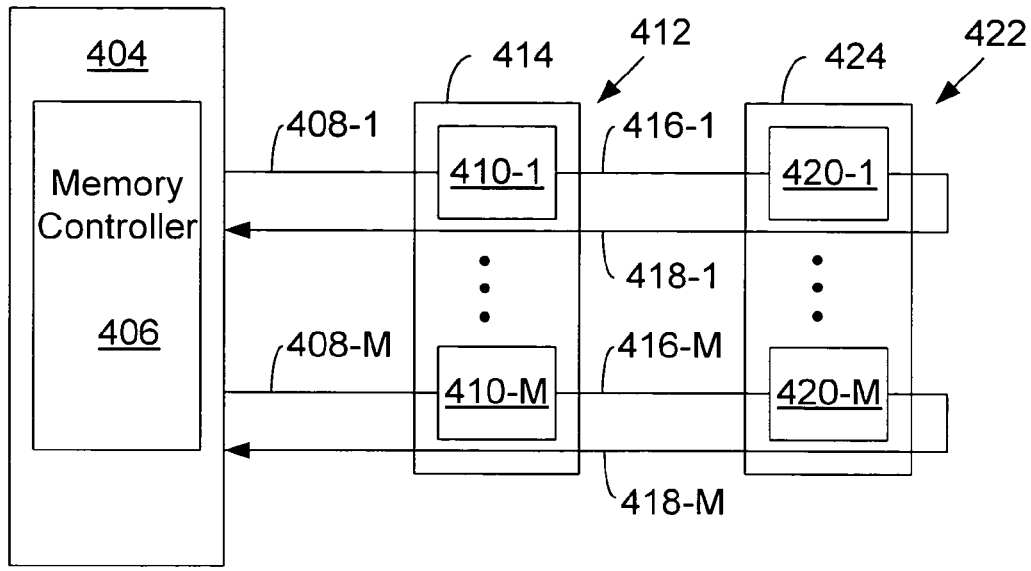

The memory controllers and memory devices described herein may be included in a variety of systems. For example, referring to FIG. 11, chip 404 includes a memory controller 406. Conductors 408-1 . . . 408-M each represent one of more unidirectional or bidirectional interconnects. A memory device may repeat signals to a next memory device. For example, memory devices 410-1 . . . 410-M repeat some signals to memory devices 420-1 . . . 420-M through interconnects 416-1 . . . 416-M. The signals may include command, address, and write data. The signals may also include read data. Read data may be sent directly from memory devices 410-1 . . . 410-M to memory controller 406 through interconnects 408-1 . . . 408-M. However, if read data is repeated from memory devices 410-1 . . . 410-M to memory devices 420-1 . . . 420-M then, in some embodiments, the read data need not be also sent directly from memory devices 410-1 . . . 410-M to memory controller 406. Read data from memory devices 420-1 . . . 420-M may be sent to memory controller 406 through interconnects 418-1 . . . 418-M. Interconnects 418-1 . . . 418-M are not included in some embodiments. Memory devices 410-1 . . . 410-M may be on one or both sides of a substrate 414 of a memory module 412. Memory devices 420-1 . . . 420-M may be on one or both sides of a substrate 424 of a memory module 422. Alternatively, chips including memory devices 410-1 . . . 410-M may be on the motherboard that supports chip 404 and module 424. In this case, substrate 414 represents a portion of the motherboard. The chips may be in stacks.

Figure 12:
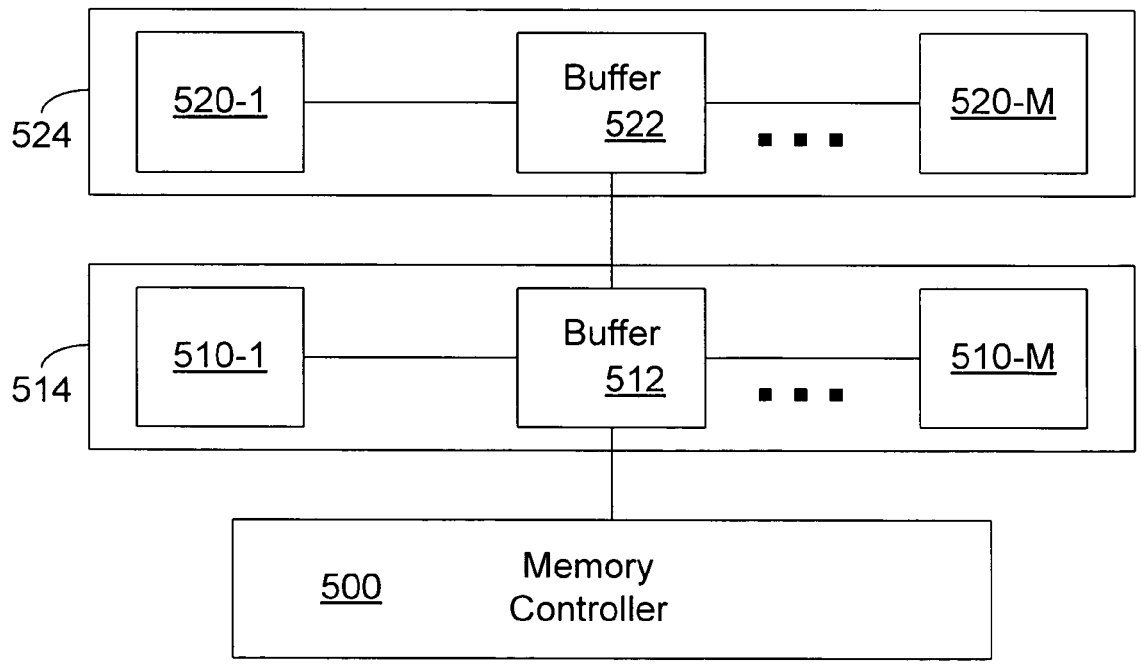

FIG. 12 illustrates a system in which memory chips 510-1 . . . 510-M are on one or both sides of a memory module substrate 514 and memory chips 520-1 . . . 520-M are on one or both sides of a memory module substrate 524. In some embodiments, memory controller 500 and chips 510-1 . . . 510-M communicate to each other through buffer 512, and memory controller 500 and chips 520-1 . . . 520-M communicate through buffers 512 and 522. In such a buffered system, the memory controller can use different signaling with the buffer than the buffer uses with the memory devices. Some embodiments may include additional conductors not shown in FIG. 12.

FIG. 13 illustrates first and second channels 536 and 538 coupled to a chip 532 including a memory controller 534. Channels 536 and 538 are coupled to memory modules 542 and 544, respectively, that include chips such as are described herein.

In FIG. 14, a memory controller 552 (which represents any of previously mentioned memory controllers) is included in a chip 550, which also includes one or more processor cores 554. An input/output controller chip 556 (which may be a hub chip) is coupled to chip 550 and is also coupled to wireless transmitter and receiver circuitry 558. In FIG. 15, memory controller 552 is included in a chip 574, which may be a hub chip. Chip 574 is coupled between a chip 570 (which includes one or more processor cores 572) and an input/output controller chip 578, which may be a hub chip. Input/output controller chip 578 is coupled to wireless transmitter and receiver circuitry 558.

Additional Information and Embodiments

In different embodiments, the links may have different numbers of lanes. For example, link 34 may have six lanes, lane 20 may have eight lanes, link 22 may have one lane, lane 16 may have two lanes, and lane 18 may have four lanes, but a different number of lanes may be used. It may be desirable for the write frames to have at least half the number of lanes as the read frames. Each lane may include only one conductor if signal ended signaling is used or two conductors is differential signaling is used.

A single memory core is shown in the chips, but there could be multiple memory cores.

CRC checksums are only one type of error detection signals that may be used.

In some embodiments, the validity signal is provided to the memory core. One reason is to notify memory core 82 that of an invalid checksum associated with one of the commands in a chain of speculative commands. Memory core 82 may then ignore later commands in the chain. However, in some embodiments, the time taken to compute an invalid checksum might greater than needed to complete a chain of speculative commands.

The inventions are not restricted to any particular signaling techniques or protocols. For example, the signaling may be single ended or differential. The signaling may include only two voltage levels or more than two voltage levels. The signaling may be single data rate, double data rate, quad data rate, or octal data, etc. The signaling may involve encoded symbols and/or packetized signals. A clock (or strobe) signal may be transmitted separately from the signals or embedded in the signals. Various coding techniques may be used. The inventions are not restricted to a particular type of transmitters and receivers. Various clocking techniques could be used in the transmitters and receivers and other circuits. The receiver symbols in the figures may include both the initial receiving circuits and related latching and clocking circuits. The interconnects between chips each could be point-to-point or each could be in a multi-drop arrangement, or some could be point-to-point while others are a multi-drop arrangement.

In the figures showing one or more modules, there may be one or more additional modules in parallel and/or in series with the shown modules.

In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
a memory core;
error detection circuitry to determine the validity of error detection signals associated with speculative and non-speculative commands received by the chip and to provide validity signals indicative of the determined validity; and
a control unit to provide the speculative commands to the memory core to be acted on before the control unit receives the associated validity signals and to provide the non-speculative commands to the memory core to be acted on only after receiving associated validity signals that indicate the associated error detection signals are valid.

2. The chip of claim 1, wherein the error detection signals for the commands are a cyclic redundancy check (CRC) checksum in a group of signals including the commands.

3. The chip of claim 1, wherein the error detection circuitry calculates the error detection signals for a group of bits including the commands and compares it with received error detection signals, and the validity signal indicates validity when they are the same and invalid when they are not.

4. The chip of claim 1, further comprising transmitters to receive the validity signals and provide them to an external link.

5. The chip of claim 1, further comprising transmitters to provide signals to an external link and gating logic to receive read data signals from the memory core and to provide the read data signals to the transmitters only after receiving associated validity signals indicating valid error detection signals.

6. The chip of claim 5, wherein the gating logic arranges the read data signals in a frame with additional control bits.

7. The chip of claim 5, wherein the gating logic does not provide the read data signals to the transmitters if the received associated validity signals indicate invalid error detection signals.

8. The chip of claim 5, wherein the gating logic does not provide the read data signals to the transmitters if any of the received associated validity signals for any of the commands in a chain of commands indicate invalid error detection signals.

9. The chip of claim 1, further comprising transmitters and logic to receive the validity signals and when the validity signals indicate invalid error detection signals to provide signals representative of the validity signals to the transmitters to be transmitted to an external link.

10. The chip of claim 9, wherein the logic is gating logic to receive read data signals from the core and to selectively provide them to the transmitters.

11. The chip of claim 9, further comprising additional transmitters and wherein the logic is gating logic to receive read data signals from the core and to selectively provide them to the additional transmitters.

12. The chip of claim 1, wherein the error detection signals for the commands are a cyclic redundancy check (CRC) checksum in a group of signals including the commands, wherein the group of signals for some of the commands includes more than one frame.

13. The chip of claim 1, further comprising:

first transmitters to provide signals to an external link; and gating logic to receive read data signals from the core and provide them to the first transmitters in response receiving a validity signal indicating a read command associated with the read data signals has valid error detection signals.

14. The chip of claim 13, further comprising:

second transmitters to receive the signals indicating validity or invalidity from the gating logic and to provide them to an external link.

15. The chip of claim 13, wherein if the validity signals indicate the error detection signals for the read commands are invalid, the gating circuitry does not provide the read data signals to transmitters.

16. The chip of claim 1, wherein the some of the commands are chains of commands.

17. The chip of claim 1, wherein an alert signal is provided to indicate that a particular group of the error detection signals is not valid.

18. A system comprising:

a first chip including:

(a) a memory core;

(b) error detection circuitry to determine the validity of error detection signals associated with speculative and non-speculative commands received by the chip and to provide validity signals indicative of the determined validity; and (c) a control unit to provide the speculative commands to the memory core to be acted on before the control unit receives the associated validity signals and to provide the non-speculative commands to the memory core to be acted on only after receiving associated validity signals that indicate the associated error detection signals are valid;

a second chip coupled to the first chip, wherein the second chip includes:

(a) scheduling circuitry to schedule commands to be provided to the first chip;

(b) receivers to signals from the first chip indicating the groups of data including the speculative commands were determined to have invalid error detection signals in the first chip; and (c) a error handling unit to receive signals in response to detection of the error alert signals and to respond thereto.

19. The system of claim 18, wherein the error detection signals for the commands are a cyclic redundancy check (CRC) checksum in a group of signals including the commands.

20. The system of claim 18, wherein the error detection circuitry calculates the error detection signals for a group of bits including the commands and compares it with received error detection signals, and the validity signal indicates validity when they are the same and invalid when they are not.

21. The system of claim 18, further comprising transmitters to receive the validity signals and provide them to an external link between the first and second chips.

22. The system of claim 18, wherein the error handling unit responds by causing the scheduling circuitry to reschedule involved commands in some circumstances.

23. The system of claim 18, wherein the second chip includes processor cores and is coupled to a third chip including wireless transmitter and receiver circuitry.

* * * * *